(12) United States Patent
Chou et al.

(10) Patent No.: US 10,389,620 B2
(45) Date of Patent: Aug. 20, 2019

(54) SYSTEM AND APPARATUS OF A SOFTWARE-SERVICE-DEFINED-NETWORK (SSDN)

(71) Applicant: Futurewei Technologies, Inc., Plano, TX (US)

(72) Inventors: Wu Chou, Basking Ridge, NJ (US); Min Luo, Cumming, GA (US); Li Li, Bridgewater, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/689,878

(22) Filed: Aug. 29, 2017

(65) Prior Publication Data

US 2018/0006929 A1 Jan. 4, 2018

Related U.S. Application Data

(63) Continuation of application No. 14/806,154, filed on Jul. 22, 2015, which is a continuation of application No. 13/829,076, filed on Mar. 14, 2013, now Pat. No. 9,106,515.

(60) Provisional application No. 61/716,982, filed on Oct. 22, 2012, provisional application No. 61/780,347, filed on Mar. 13, 2013.

(51) Int. Cl.
*H04L 12/28* (2006.01)
*H04L 12/721* (2013.01)
*H04L 12/761* (2013.01)
*H04L 12/24* (2006.01)

(52) U.S. Cl.
CPC ............ *H04L 45/14* (2013.01); *H04L 41/042* (2013.01); *H04L 41/044* (2013.01); *H04L 41/12* (2013.01); *H04L 45/16* (2013.01); *H04L 41/0803* (2013.01); *H04L 41/0806* (2013.01); *H04L 41/0809* (2013.01)

(58) Field of Classification Search
CPC ...................................................... H04L 41/12
See application file for complete search history.

(56) References Cited

U.S. PATENT DOCUMENTS 9,286,231 B2 3/2016 Tzelnic et al.
2005/0073522 A1* 4/2005 Aholainen .............. H04L 41/12
345/440

(Continued)

OTHER PUBLICATIONS

Open Networking Foundation, "OpenFlow Management and Configuration Protocol (OF-Config 1.1)," Version 1.1, Jun. 25, 2012, 117 pages.

(Continued)

*Primary Examiner* — Farah Faroul
(74) *Attorney, Agent, or Firm* — Conley Rose, P.C.

(57) ABSTRACT

A network apparatus for a network software service layer (NSSL) service bus. The network apparatus includes a memory storing executable instructions and a processor coupled to the memory, the processor executing the executable instructions, where the processor is configured to receive a service description comprising a named service and a network identifier identifying a network node associated with the named service, select a service description according to the named service, and transmit a named service request to the network node according to the service description selected.

12 Claims, 6 Drawing Sheets

(56) References Cited

U.S. PATENT DOCUMENTS

| | | | |
|---|---|---|---|
| 2005/0262299 A1* | 11/2005 | Mimatsu | G06F 3/0605 711/114 |
| 2007/0236346 A1 | 10/2007 | Helal et al. | |
| 2008/0165789 A1 | 7/2008 | Ansari et al. | |
| 2009/0064305 A1 | 3/2009 | Stiekes et al. | |
| 2012/0177039 A1* | 7/2012 | Berman | H04L 45/02 370/390 |
| 2013/0329601 A1 | 12/2013 | Yin et al. | |
| 2014/0003232 A1* | 1/2014 | Guichard | H04L 67/16 370/230 |
| 2014/0177634 A1 | 6/2014 | Jiang et al. | |
| 2014/0201374 A1 | 7/2014 | Ashwood-Smith et al. | |
| 2015/0016477 A1 | 1/2015 | Ogawa et al. | |
| 2015/0019746 A1 | 1/2015 | Shatzkamer et al. | |
| 2015/0067375 A1 | 3/2015 | Iwasa | |
| 2015/0223104 A1 | 8/2015 | Xu et al. | |
| 2016/0080254 A1 | 3/2016 | Zhou et al. | |
| 2016/0119379 A1 | 4/2016 | Nadkarni et al. | |
| 2016/0234730 A1 | 8/2016 | John et al. | |

OTHER PUBLICATIONS

Open Networking Foundation, "OpenFlow Configuration and Management Protocol (OF-Config 1.0)," 2011, 73 pages.
Open Networking Foundation, "OpenFlow Switch Specification, Version 1.0.0, (Wire Protocol 0x01)," Dec. 31, 2009, 42 pages.
Open Networking Foundation, "OpenFlow Switch Specification, Version 1.1.0 Implemented, (Wire Protocol 0x02)," Feb. 28, 2011, 56 pages.
Open Networking Foundation, "OpenFlow Switch Specification, Version 1.2, (Wire Protocol 0x03)," Dec. 5, 2011, 83 pages.
Notice of Allowance dated Apr. 3, 2015, 13 pages, U.S. Appl. No. 13/829,076, filed Mar. 14, 2013.
Non-Final Office Action dated Nov. 11, 2016, 6 pages, U.S. Appl. No. 14/806,154, filed Jul. 22, 2015.

* cited by examiner

SYSTEM AND APPARATUS OF A SOFTWARE-SERVICE-DEFINED-NETWORK (SSDN)

CROSS-REFERENCE TO RELATED APPLICATIONS

The present application is a continuation of U.S. patent application Ser. No. 14/806,154 filed Jul. 22, 2015 by Wu Chou, et al., and entitled "System and Apparatus of a Software-Service-Defined-Network (SSDN)," which is a continuation of U.S. patent application Ser. No. 13/829,076, now U.S. Pat. No. 9,106,515, filed Mar. 14, 2013 by Wu Chou, et al., and entitled "System and Apparatus of a Software-Service-Defined-Network (SSDN)," which claims priority to U.S. Provisional Patent Application No. 61/716,982 filed Oct. 22, 2012 by Wu Chou and entitled "System and Apparatus of a Software-Service-Defined-Network (SSDN)" and U.S. Provisional Patent Application No. 61/780,347 filed Mar. 13, 2013 by Wu Chou, et al. and entitled "System and Apparatus of a Software-Service-Defined-Network (SSDN)," all of which are incorporated herein by reference as if reproduced in their entireties.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software defined networking (SDN) is a next generation data network in which the control plane is separated from the data plane and implemented in a software application. This architecture allows network administrators to have programmable central control of network traffic without requiring physical access to the network's devices. Thus, SDN decouples network control (e.g. learning and forwarding decisions) from the data plane used to forward network traffic. Decoupling the control plane from the data plane of the network enables the network controller to efficiently control the network traffic through globally optimized traffic engineering and routing, which departs from locally optimized shortest path forwarding (SPF). SDN may also simplify network operations, or even have the capabilities to flatten the network with extended data routing vectors. The extended data routing vectors in SDN can cover network information from multiple Open Systems Interconnection (OSI) layers (e.g. Layer 2 (L2) and/or Layer (L3)) for intelligent routing purposes. A basic approach to achieve decoupling of the network control from the network topology and data plane is by applying globally aware and topology decoupled software control at the edges of the network. The assumption is that traditional topology-coupled bridging and routing may be re-used at the core of the network so that scalability, interoperability, high availability, and extensibility of the conventional networking protocols, such as Internet Protocol (IP) networks can still be maintained.

SUMMARY

In one embodiment, the disclosure includes a network apparatus for a network software service layer (NSSL) service bus. The network apparatus includes a memory storing executable instructions and a processor coupled to the memory, the processor executing the executable instructions, where the processor is configured to receive a service description comprising a named service and a network identifier identifying a network node associated with the named service, select a service description according to the named service, and transmit a named service request to the network node according to the service description selected.

In another embodiment, the disclosure includes a network controller including a local network information base (NIB) comprising data packet forwarding information, core logic coupled to the NIB, where the core logic comprises routing logic configured to consult the local NIB to determine a path for a data packet traversing through a network, and a transmitter configured to instruct one or more of a plurality of switches to transmit the data packet according to the path determined.

In another embodiment, the disclosure includes a method of forwarding named service requests including storing a first service description in a service registration, where the first service description comprises a name of a service and a network node identifier of a network node that provides a named service, receiving a first service request, wherein the first service request comprises a requested named service, select the network node identifier associated with the requested named service in the service registration, and transmitting the first service request to the network node associated with the network node identifier selected.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
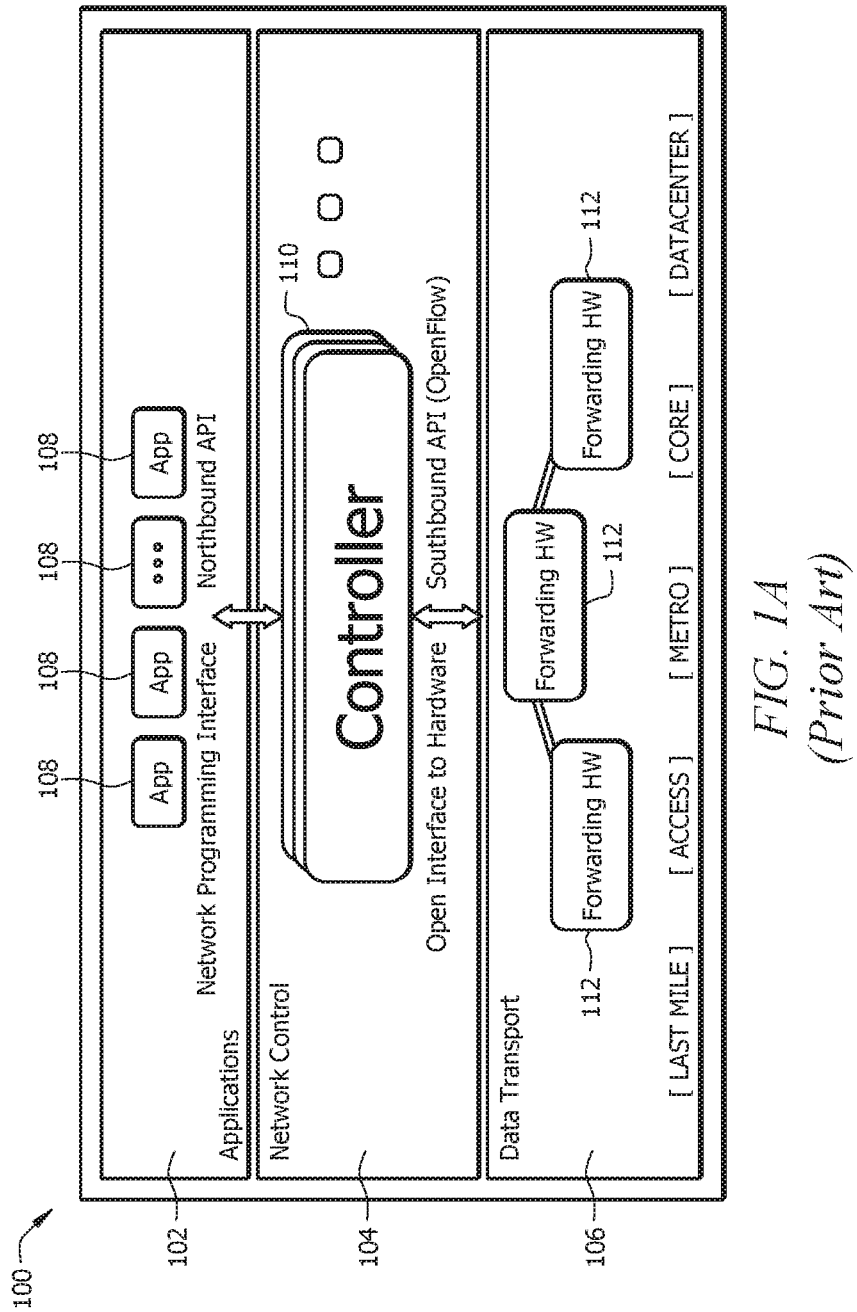
FIG. 1A is a schematic diagram of the current SDN paradigm.

SDN has become increasingly important for intelligent network engineering. SDN may become the infrastructure of the next generation data networking. SDN has the potential to make the network intelligent, open, globally optimized, and its routing dynamically adjustable to best fit the application needs. FIG. 1A is a schematic diagram of the current SDN paradigm 100 (e.g. prior art). The current SDN paradigm 100 may comprise an application layer 102, a network control layer 104, and a data transport layer 106. The application layer 102 may comprise a plurality of applications 108 that may be utilized by the network control layer 104 and/or the data transport layer 106. The network control layer 104 may determine paths for data packets to travel through a network. The data transport layer 106 may be the layer in which data flows from a source to a destination. The data transport layer may comprise a plurality of forwarding hardware (HW) 112 that may include switches and/or other network devices used for transporting data from a data center through a core network, a metro network, an access network, and the last mile to an end user. The network control layer 104 may comprise a plurality of controllers 110 (e.g., OpenFlow® (OF) controllers). The applications 108 in the data transport layer 106 may be coupled to the controllers 110 in the network control layer 104 via a plurality of "northbound" application programming interfaces (APIs). The controllers 110 may be coupled to the forwarding HW 112 via "southbound" APIs (e.g., the OF protocol). The controllers 110 may provide path forwarding instructions to the forwarding HW 112.

Unfortunately, huge technical challenges arise when implementing SDN for large scale development. In particular, SDN may result in an unprecedented large scale software based network system. As shown in FIG. 1A, implementation of the application layer 102 and the network control layer 102 may result in a large, complex software based network system. The current SDN paradigm 100 provides a framework for "north-south" connections that provide communication between applications 108 and controllers 110 via the "northbound" API and between controllers 110 and forwarding hardware 112 via the "southbound" API. However, FIG. 1A does not illustrate a framework for "east-west" connections (e.g. an "eastbound" API and/or a "westbound" API) to manage the controllers 110 within the network control layer 102. As a result, the current SDN paradigm 100 may not provide a connection framework that provides communication amongst the controllers 110. Without a solid and sound software architectural foundation, SDN may be limited to some point solutions that may prevent its anticipated value from being fully realized. Hence, a solution is needed to efficiently implement SDN for a large scale development.

Disclosed herein is a system, method, and apparatus for an SSDN. Further disclosed is an SSDN framework which may comprise an NSSL that may provide a service plane dedicated for network management and network control services. The NSSL may sit on top of the network layer and may expose network resources (e.g. the controller), the data forwarding switch, and other network functions, as services. NSSL may provide a service abstraction layer for SSDN and services deployed on NSSL may be addressed and consumed through service names and corresponding service interfaces to control and manage network resources and provide network services. NSSL may support advanced service computing features, such as late binding, mobility, failover, load balancing, in a tightly coupled network system.

Also disclosed herein is a distributed service bus on the NSSL for service federation and management. The distributed service bus may provide seamless extension of the local SSDN network into a global SSDN network with the ability to support substantially optimized end-to-end service routing. Additionally, a Network Information Base (NIB) architecture is disclosed. The federated NIB architecture may dynamically combine and extend the NIB of local networks into a global NIB to support global network management and end-to-end optimized routing.

Figure 1B:
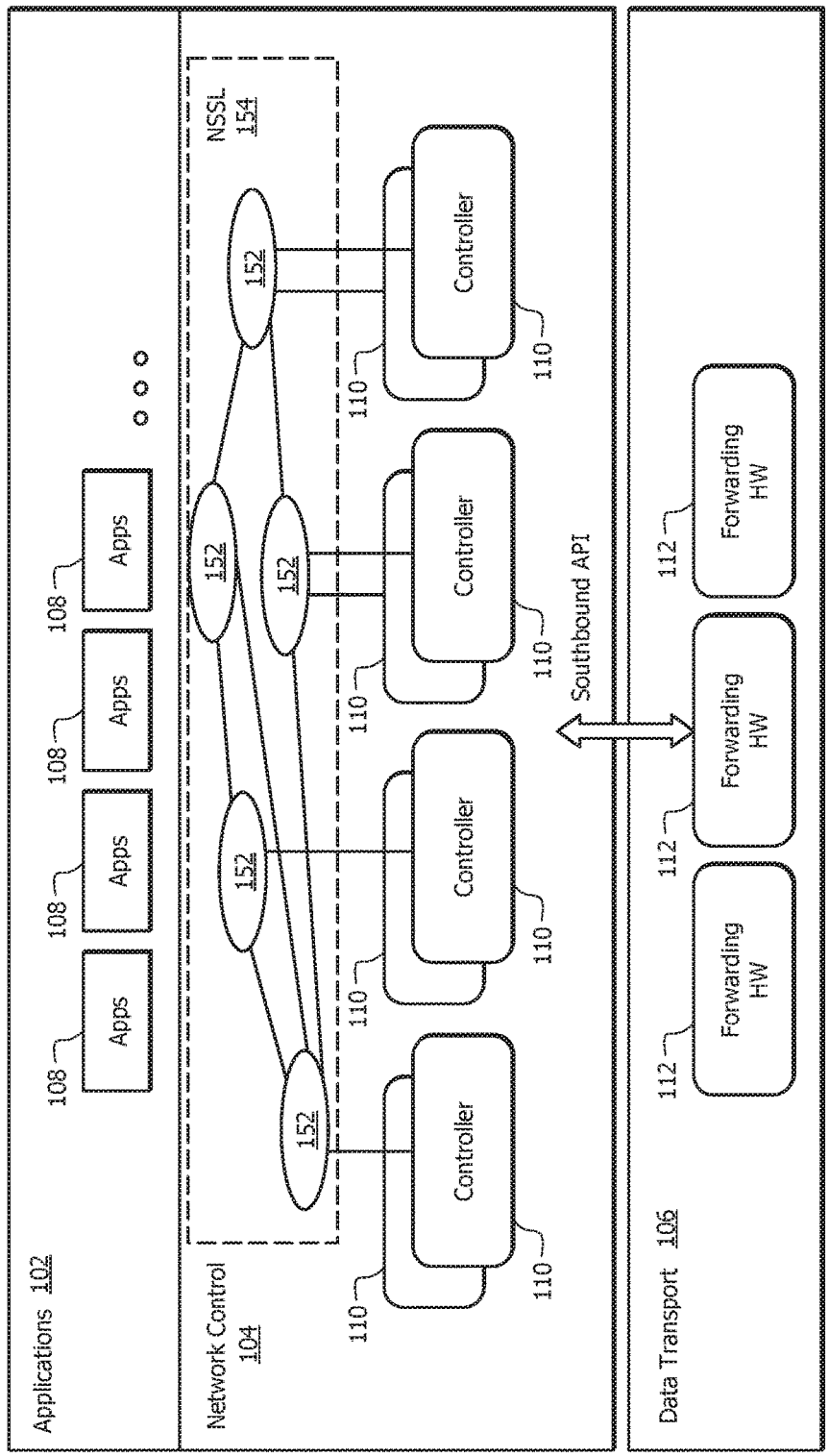
FIG. 1B is a schematic diagram of an SSDN paradigm that includes the NSSL.

FIG. 1B is a schematic diagram of an SSDN paradigm 150 that includes the NSSL 154. Similar to the SDN paradigm 100 discussed in FIG. 1A, the SSDN paradigm 150 may comprise an application layer 102, a network control layer 104, and a data transport layer 106. Moreover, the application layer 102 may comprise a plurality of applications 108; the network control layer 104 may comprise a plurality of controllers 110, and the data transport layer 106 may comprise a plurality of forwarding HW 112. In one embodiment, an NSSL 154 may sit on top of the network control layer 104 that may provide a service plane for the network control and management functionalities provided by the network control layer 104. The NSSL 154 may provide a network service abstraction layer that supports the "east-west" network via service federation. In other words, the NSSL 154 may be configured to support the addition of controllers 110 and forwarding HW 112 within the network control layer 104 and the data transport layer 106, respectively. The NSSL may comprise a plurality of service buses 152 that provide a distributed service access layer. The service buses 152 may support service mobility, migration, failover, and load balancing of the controllers 110. Furthermore, the service buses 152 may support a variety of services, such as service computing operations of late binding, service discovery, service morphing, and service planning. The services may be implemented using hardware, software, or a combination of both. FIG. 1B also illustrates that the NSSL 154 may be implemented within the network control layer 104. In another embodiment, the NSSL 154 may be a separate logical layer and exist between the application layer 102 and the network control layer 102.

Figure 2:
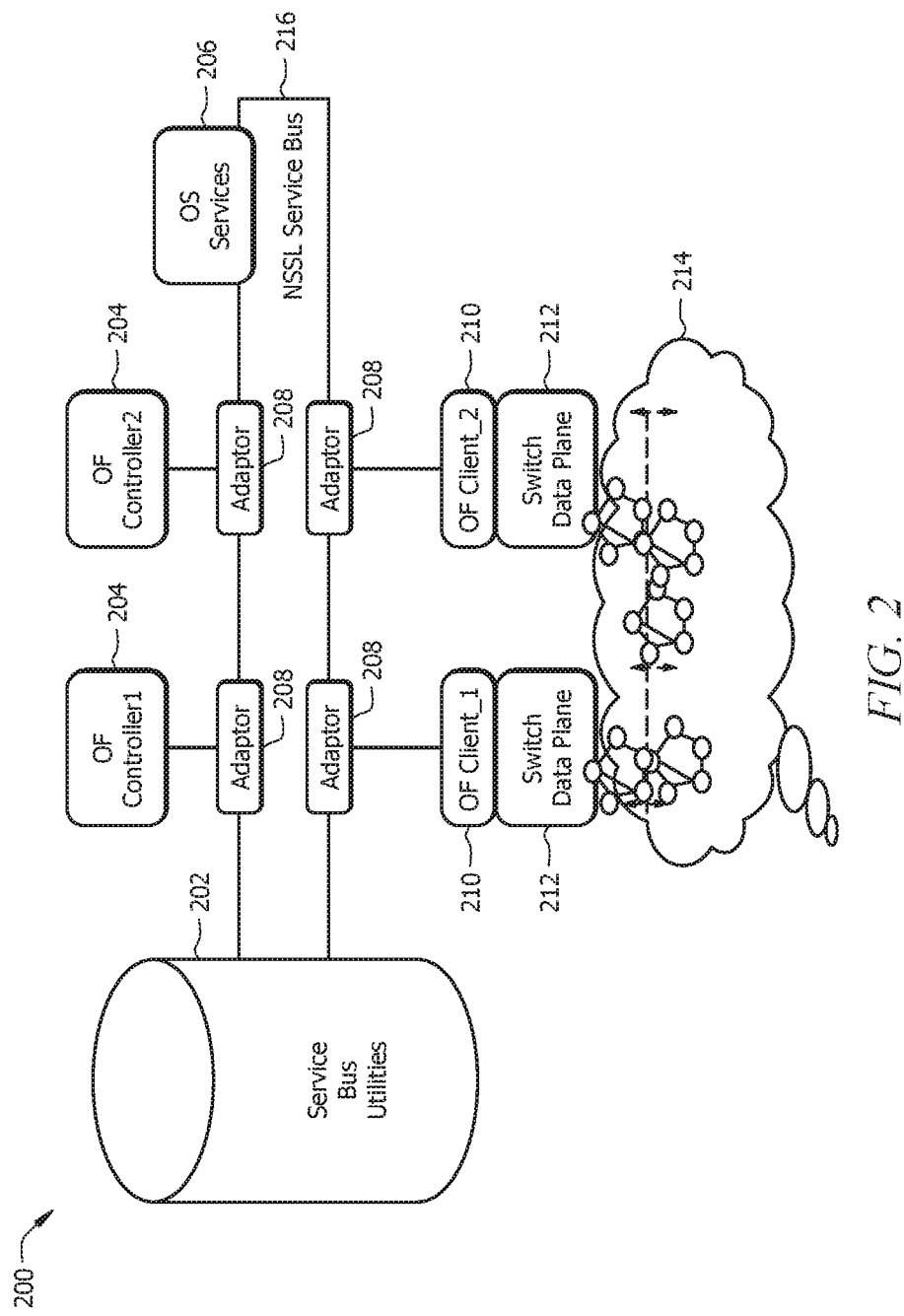
FIG. 2 is a schematic diagram of an SSDN in accordance with a disclosed embodiment.

FIG. 2 is a schematic diagram of an SSDN network 200 in accordance with a disclosed embodiment. As discussed above, the SSDN network 200 may support advanced service computing operations such as late binding, service discovery, service morphing, and service planning. The SSDN network 200 may provide a logical, centralized, and physically distributed global network view for networking to compute routing amongst a plurality of OF controllers 204. The SSDN network 200 may provide a service composition framework through the NSSL service bus 216 that also support northbound applications (e.g. applications 108 in FIG. 1B). As shown in FIG. 2, the SSDN network 200 may comprise service bus utilities node 202, a plurality of OF controllers 204, network operating system (OS) services node 206, an NSSL service bus 216, a plurality of adapters 208, a plurality of OF clients 210, a switch data plane 212, and a network 214. The NSSL may comprise a variety of service components, such as the service bus utilities node 202, the OF controllers 204, OS services node 206, adapters 208, OF clients 210, and NSSL service bus 216. In one embodiment, SSDN network 200 may represent local SSDN networks 200 coupled together to form a global SSDN network. Local SSDN networks and global SSDN networks will be discussed in more detail in FIG. 3.

The service bus utilities node 202 may comprise data storage and may store various service bus utilities, such as utilities facilitating communication and interaction between the OF controllers 204. The service bus utilities node 202 may facilitate the transfer of various service bus utilities via the NSSL service bus 216. The NSSL service bus 216 may be a distributed service access layer and a service plane for network control and management. The NSSL service bus 216 may provide a generic network service abstraction layer that may support "east-west" network expansion via service federation. Service federation may be the process through which the NSSL service bus 216 from different autonomous systems (AS) can share their services. The NSSL service bus 216 may be an architecture that may provide service registration, service discovery, message addressing, message routing, and other services for OF controllers 204, OF clients 210, and other service components coupled to the NSSL service bus 216. In one embodiment, the NSSL service bus 216 may be a local NSSL service bus that may be coupled with other local NSSL service buses. In another embodiment, the NSSL service bus 216 may represent a global NSSL service bus 216 that comprises one or more local NSSL service buses that spans across multiple networks 214. The NSSL service bus 216 may comprise a processor or logic unit and storage.

FIG. 2 illustrates that OF controllers 204 and the OF clients 210 may be coupled to the NSSL service bus 216 via the adaptors 208. The adaptors 208 may be configured to act as the service interface for the OF controllers 204 and OF clients 210. By coupling the OF controllers 204 to the adaptors 208, the NSSL service bus 216 may provide load balancing between the OF controllers 204. The NSSL service bus 216 may also promote communication between the OF controllers 204 such that each OF controller's 204 NIB may comprise the same entries such that routing decisions made by either of the OF controllers 204 are the same. The NSSL service bus 216 may provide the ability to add additional OF controllers 204 as necessary in order to adequately manage and control SSDN network 200. The NSSL service bus 216 may provide service composition, service discovery, service management, service fail over, and load balancing between the OF controllers 204, and between the OF controllers 204 and the OF clients 210. The NSSL service bus 216 may provide "east-west" network expansion capability through NSSL service bus federation and may provide a consistent service oriented framework.

The OF controllers 204 may be configured to implement control plane functions and to control and manage OF clients 210. Control plane functions may include route or path determination for data packets traversing the network 214. More specifically, OF controllers 204 may be able to produce routing tables and/or flow tables that defines how to route data packets within network 214. In FIG. 2, OF controller 204 may provide control services to both OF client_1 210 and OF client_2 210. Similarly, OF controller2 204 may also provide control services to both OF client_1 210 and OF client_2 210. The OF controller 204 may not perform data plane functions, such as forwarding data traffic to a selected destination within network 214. The OF controllers 204 may deploy network resources to the NSSL as services via the corresponding adaptors 208. In one embodiment, the services may be addressed by service names and may support service mobility, migration, failover, and load balancing.

The OF clients 210 may be clients of the OF controllers 204, such as OF switches. The OF clients 210 may provide data forwarding for network 214. The OF client 210 may comprise a switch data plane 212 configured to route data through the network 214. OF clients 210 may be any physical and/or virtual network device that receives and transmits data through network 214. OF clients 210 may comprise switches, routers, bridges, or any other devices compatible with the southbound API services. For example, OF clients 210 may be configured according to the OpenFlow protocols as defined in Rev. 1.2 for the OpenFlow specification of the OpenFlow Organization, published December 2011, which is incorporated herein as if reproduced in its entirety. Furthermore, OF clients 210 may also include network devices that are compliant with other versions of the OpenFlow protocols (e.g. Rev. 1.0 and Rev. 1.1). In one embodiment, OF clients 210 may be incompatible with other versions of the OpenFlow protocols. For example, one OF client 210 may support the OpenFlow protocol version 1.0, but not later versions, while another OF client 210 may support the OpenFlow protocol version 1.2, but not earlier versions.

The OS services node 206 may be a network OS that provides facilities for addressing the OF controllers 204. The OS services node 206 may be independent of various programming languages. The OS services node 206 may be configured to manage network resources, including physical and virtual networks, for network applications. For example, the OS services node 206 may be implemented to manage data, users, groups, security, applications, and other networking functions. In one embodiment, the OS services node 206 may operate and perform functions in the OSI layer 3 within one or more network devices, such as routers, switches, and servers.

Figure 3:
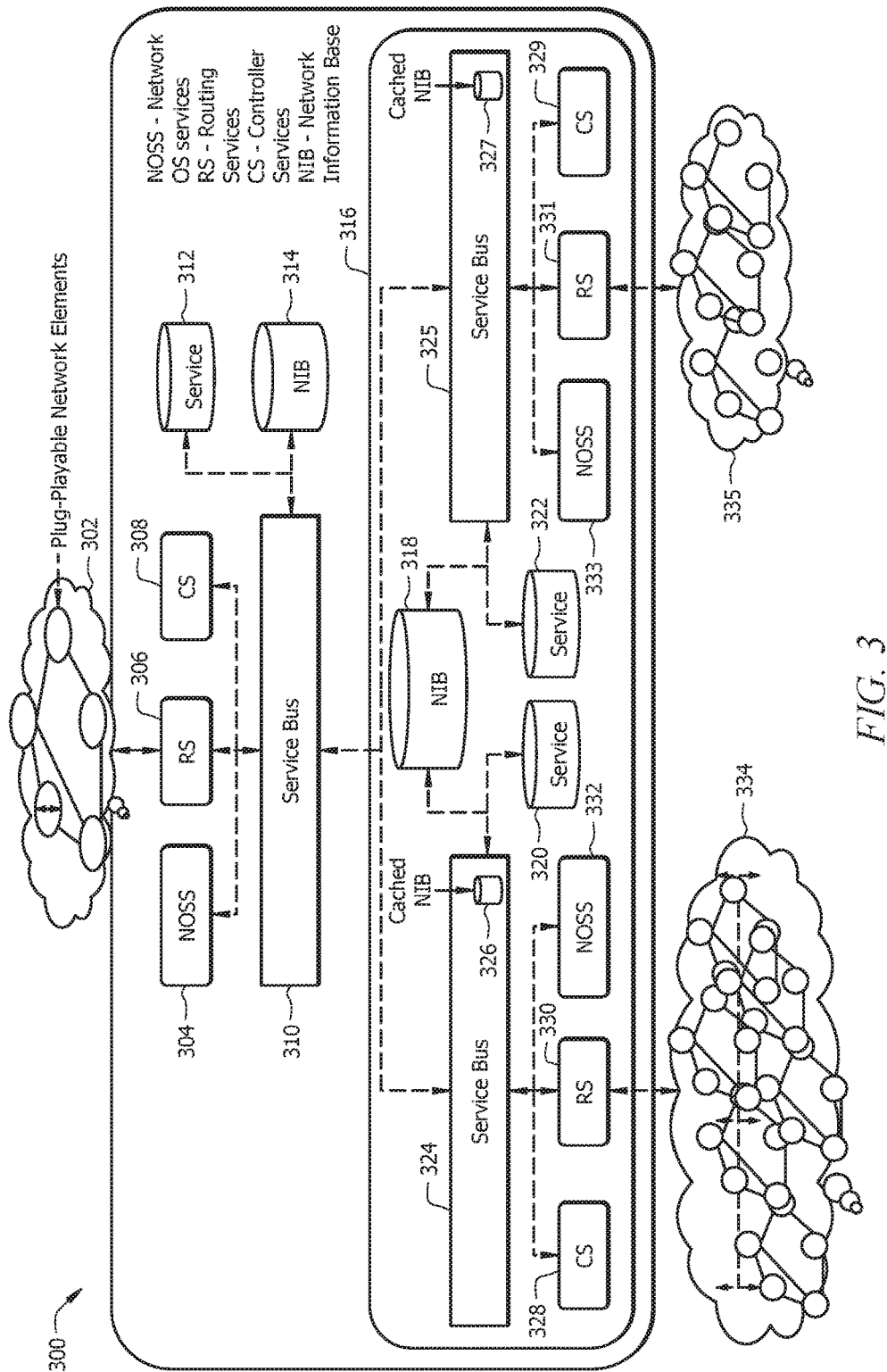
FIG. 3 is a schematic diagram of system for coupling multiple SSDNs in accordance with a disclosed embodiment.

FIG. 3 is a schematic diagram of another embodiment of an SSDN network 300. As discussed above, by implementing NSSL, the SSDN network 300 may provide a network service abstraction layer that supports the "east-west" network via service federation. FIG. 3 illustrates that SSDN network 300 may comprise coupling a plurality of local service buses 310, 324 and 325 for networks 302, 334, and 335, respectively. The local service buses 310, 324, and 325 may be located within local SSDN networks. The coupling of the local service buses 310, 324, and 325 may form a global service bus that spans across multiple networks (e.g. networks 302, 334 and 335). With a global service bus, the SSDN network 300 may combine routing services, control services, and network OS services (NOSS) component for networks 302, 334, and 335 to form a global SSDN network 300. In one embodiment, networks 302, 334, and 335 may be different AS that share services via coupled local service buses 310, 324, and 325 to form a global service bus. As shown in FIG. 3, local service bus 310 may be coupled to a global NIB 314, while the local service buses 324 and 325 located within the SSDN sub-network 316 may share a global NIB 318. Other embodiments of SSDN network 300 may have separate global NIBs 314 coupled to each local service buses 310, 324, and 325 or share one global NIB 318 amongst the local service buses 310, 324, and 325.

FIG. 3 illustrates that the local service bus 310 may be coupled to a service bus utilities node 312 and to a global NIB 314. The service bus 310 may be configured to perform functions substantially similar to the NSSL service bus 216 discussed in FIG. 2. Moreover, the service bus utilities node 312 may be configured to perform functions substantially the similar to the service bus utilities node 202 discussed in FIG. 2. The global NIB 314 may maintain and provide necessary supporting information for resource utilization and traffic control amongst one or more networks. For instance, the global NIB 314 may provide multiple methods for the control logic to gain access to network nodes, index all the of the network nodes based on network node identifiers, track state information of network nodes, and network nodes features and capabilities. The global NIB 314 may store a graph of the forwarding HWs within a network topology instead of storing prefixes to destinations found in routing information bases (RIBs) or forwarding information bases (FIBs). Furthermore, the global NIB 314 may support logical elements (e.g. overlay tunnels) within a network.

Local service bus 310 may also be coupled to NOSS component 304, routing services (RS) component 306, and controller services (CS) component 308. The NOSS component 304 may be substantially similar to OS services node 206 discussed in FIG. 2. The RS component 306 may be coupled to network nodes within network 302. The RS component 306 may implement algorithms to forward packets between network nodes (e.g. perform data forwarding plane functions). In one embodiment, the RS component 306 may forward data traffic as performed by an SDN/OpenFlow switch in the data forwarding plane. In one embodiment, network nodes within network 302 may be configured as plug-and-play network nodes. The CS component 308 may be a plurality of controllers coupled together through the service bus 310. The CS component 308 may implement strategies to control the flow of data packets in network 302 as performed by an SDN controller in the control plane of SDN.

As shown in FIG. 3, the SSDN network 300 may be divided into an SSDN sub-network 316. The SSDN sub-network 316 may comprise one or more local SSDN networks. More specifically, the SSDN sub-network may comprise local service buses 324 and 325, CS components 328 and 329, RS components 330 and 331, NOSS component 332 and 333, service bus utilities node 320 and 322, and global NIB 314. Local service buses 324 and 325, CS components 328 and 329, RS components 330 and 331, NOSS component 332 and 333, and service bus utilities node 320 and 322, may substantially similar to local service bus 310, CS components 308, RS components 306, NOSS component 304, and service bus utilities node 312, which were discussed above. Global NIB 318 may perform functions substantially similar to the global NIB 314, except that the global NIB 318 may be shared amongst two local service buses 324 and 325.

Within the SSDN sub-network 316, local service bus 324 and 325 may be coupled to a global NIB 318. Each local service bus 324 and 325 may be coupled to a service bus utilities node 320, 322, respectively. Each local service bus 324 and 325 may comprise a cached NIB 326 and 327 that may be a store some or all of the information held within the global NIB 318. The cached NIB 326 and 327 may be a local NIB used to monitor and provide network information for local SSDN networks. For example, NIB 326 may monitor and provide network information for network 334, while NIB 327 may monitor and provide network information for network 335. In one embodiment, the cached NIB 326 and 327 may store network information most frequently access from the global NIB 318. Each local service bus 324 and 325 may be coupled to a respective CS component 328 and 329, RS component 330 and 331 and NOSS component 332 and 333. The RS component 330 and 331 may provide connections to network 334 and 335, respectively.

Figure 4:
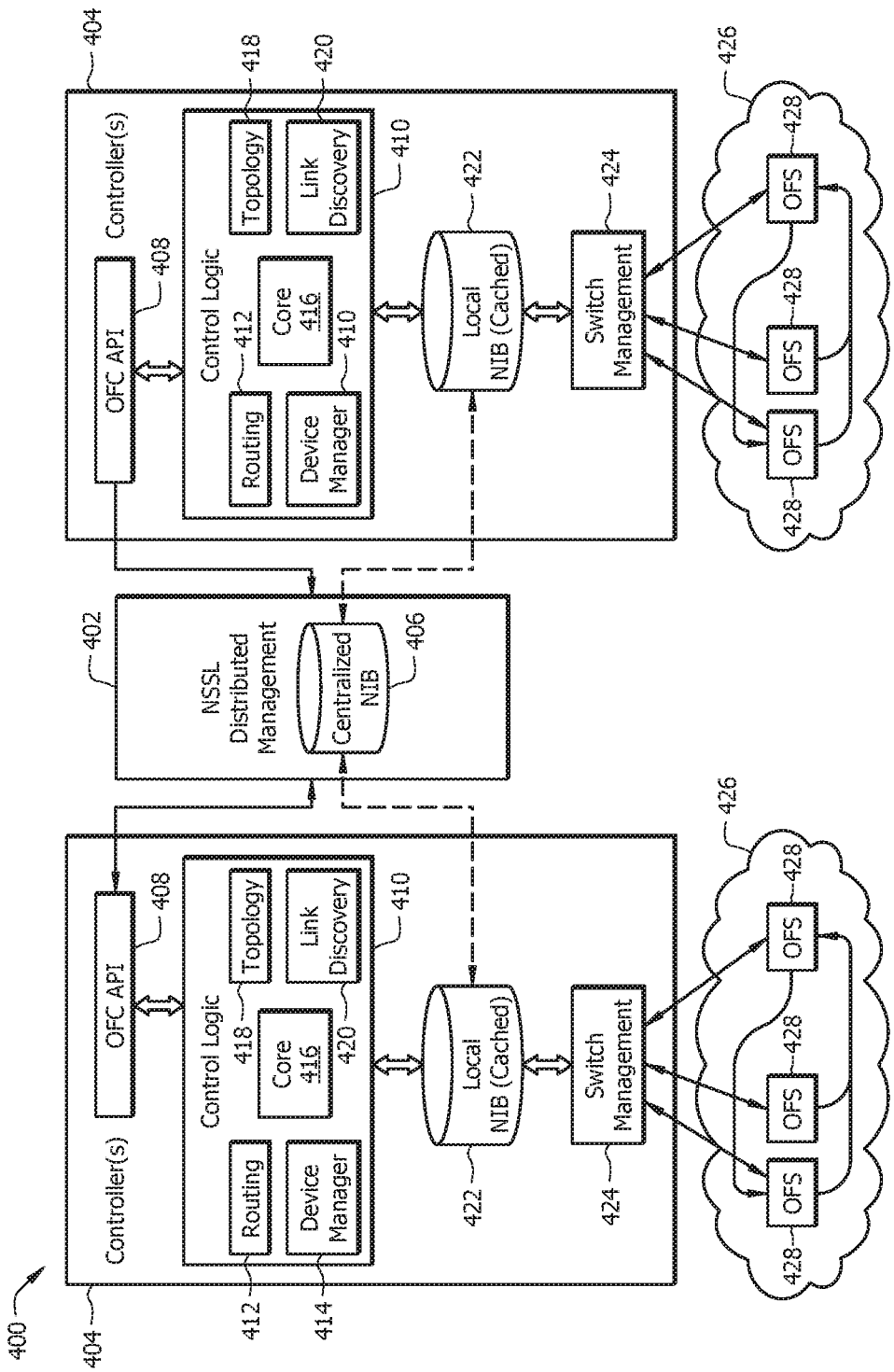
FIG. 4 is a schematic diagram of a SSDN system in accordance with a disclosed embodiment.

FIG. 4 is a schematic diagram of another embodiment of an SSDN network 400. SSDN network 400 may comprise a plurality of controllers 404 coupled by an NSSL bus 402 and a plurality of networks 426 each comprising a plurality of OF switches 428. The NSSL bus 402 may be substantially similar to a global service bus, as discussed in FIG. 3, except that the NSSL bus 402 may comprise a centralized NIB 406. The centralized NIB 406 may maintain a master copy of the forwarding information that may be copied and used by each controller 404. The centralized NIB 406 may be substantially similar to the global NIB 318 discussed in FIG. 3.

Each controller 404 may comprise an OpenFlow Controller (OFC) API 408, control logic 410, a local NIB 422, and a switch management component 424. The local NIB 422 may cache frequently accessed information or otherwise store a copy of the centralized NIB 406, which may be substantially similar to cached NIB 326 in FIG. 3. The OFC API may be coupled to the NSSL bus 402 and coordinate the actions of the controllers 404. For example, the OFC API may be a Representational State Transfer (REST) API (e.g. Floodlight® REST API) that provides application interfaces for applications used to control networks 426. The switch management component 424 may be configured to communicate with, control, and manage the OF switches 428 within networks 426. The OF switches 428 may be any network component capable of receiving, transmitting, and forwarding data through networks 426.

The control logic 410 may comprise a routing component 412, a device manager 414, a core component 416, a topology component 418, and a link discovery component 420. The routing component 412 may be configured to consult the local NIB 422 and to determine a path for a data packet traversing one or more of the networks 426 based on information retrieved from the local NIB 422. The device manager 414 may be configured to manage the OF switches 428, such as booting up the OF switches 428, shutting down the OF switches, change routing tables in the OF switches, and update software on the OF switches. The topology component 418 may be configured to determine the topology of the network(s) 426. The topology may comprise information about which OF switches 428 are connected to each other, the type of connections, the speed or data capacity of the connections, network elements coupled to the OF switches 428. The link discovery module 420 may determine when a new link between switches 428 is created or a link between switches 428 is deleted or destroyed. The core component 416 may comprise one or more processors or application specific integrated circuits (ASICs) configured to implement the functionality of the various components 412, 414, 418, 420 in the control logic component 410. In one embodiment, the core component is the platform on which the various components 412, 414, 418, 420 in the control logic component 410 may operate on.

The NSSL bus 402 may provide distributed management of the networks 426. The NSSL bus 402 may abstract the services provided by the controllers 404 and may direct a request for a particular service to an available controller 404 that is capable of providing the service. The centralized NIB 406 may dynamically combine and extend the local NIBs 422 of local networks 426 into a global NIB to support global network management and end-to-end optimized routing. In one embodiment, NSSL bus 402 may be a federated service bus (e.g. global service bus) coupled with local and distributed service components (e.g. OF controllers 404). For example, OF controllers 404 may register with the NSSL bus and expose their service descriptions. The service descriptions may defines message formats and other service information. A source OF controller 404 may send a message addressed to a destination OF controller 404 according to the destination OF controller's service description. The NSSL bus 402 may forward the message to the destination OF controller according to the service descriptions stored in the registration.

Figure 5:
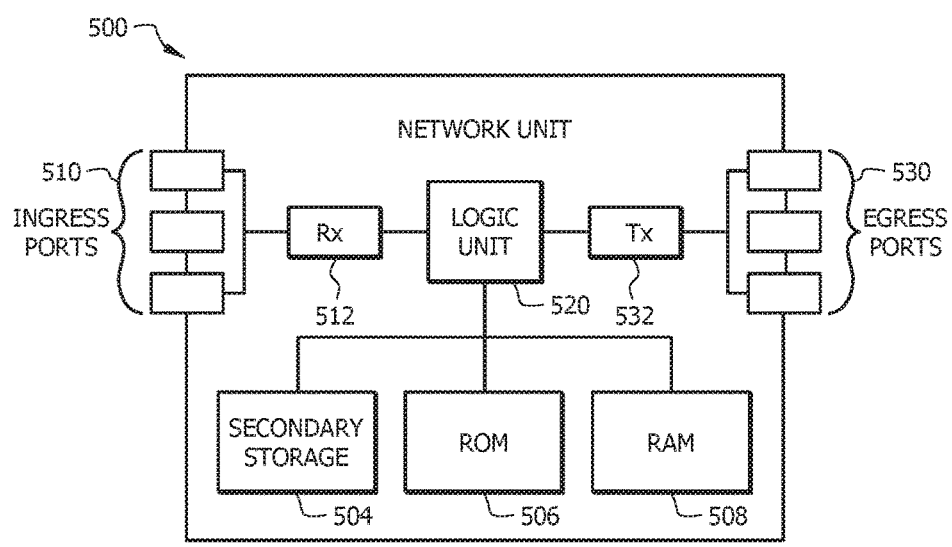
FIG. 5 illustrates an embodiment of a network unit in accordance with a disclosed embodiment.

FIG. 5 illustrates an embodiment of a network unit 500, which may be any device that transports and processes data through the network that has sufficient processing power, memory resources, and network throughput capability to handle the necessary workload placed upon it. For instance, the network unit 500 may correspond to the NSSL service buses 216, 310, 324, 325, and 402, the OF controllers 204 and 404, the OFC clients 210, and/or the OF switches 428 described above. The network unit 500 may comprise one or more ingress ports or units 510 coupled to a receiver (Rx) 512 for receiving signals and frames/data from other network components. The network unit 500 may comprise a logic unit 520 to determine which network components to send data to. The logic unit 520 may be implemented using hardware, software, or both. The logic unit 520 may be implemented as one or more central processing units (CPUs) chips, or may be part of one or more ASICs. The network unit 500 may also comprise one or more egress ports or units 530 coupled to a transmitter (Tx) 532 for transmitting signals and frames/data to the other network components. The logic unit 520 may also implement or support the SSDN and NSSL methods and schemes described above. The components of the network unit 500 may be arranged as shown in FIG. 5.

The logic unit 520 may be in communication with memory devices including secondary storage 504, read only memory (ROM) 506, and random access memory (RAM) 508. The secondary storage 504 is typically comprised of one or more disk drives or tape drives and is used for non-volatile storage of data and as an overflow data storage device if RAM 508 is not large enough to hold all working data. Secondary storage 504 may be used to store programs that are loaded into RAM 508 when such programs are selected for execution. The ROM 506 is used to store instructions and perhaps data that are read during program execution. ROM 506 is a non-volatile memory device that typically has a small memory capacity relative to the larger memory capacity of secondary storage 504. The RAM 508 is used to store volatile data and perhaps to store instructions. Access to both ROM 506 and RAM 508 is typically faster than to secondary storage 504.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network apparatus for a network software service layer (NSSL) service bus, the network apparatus comprising:
    a memory storing executable instructions and including a service registration comprising a network information base (NIB) shared between the NSSL service bus and a second NSSL service bus; and
    a processor coupled to the memory, the processor executing the executable instructions, wherein the processor is configured to:
        receive a service description comprising a name of a service and a network identifier identifying a network node that provides the service;
        select the service description according to the service; and
    a transmitter coupled to the processor, the transmitter configured to transmit a service request to the network node according to the service description selected.

2. The network apparatus of claim 1 wherein the NIB is a centralized NIB and the NSSL service bus maintains a cached NIB.

3. The network apparatus of claim 1, wherein the processor is further configured to index the service description based on the network identifier.

4. The network apparatus of claim 1, wherein the processor is further configured to couple a network operating system services (NOSS) node to the NSSL service bus, and wherein the NOSS node is configured to manage network resources for network applications.

5. The network apparatus of claim 1, wherein the processor is configured to couple a routing services (RS) node to the NSSL service bus, and wherein the RS node is configured to implement algorithms to forward packets between network nodes.

6. The network apparatus of claim 1, wherein the NSSL service bus is coupled to a controller services (CS) node, wherein the CS node is configured to implement strategies to control a flow of data packets in a network.

7. The network apparatus of claim 1, wherein the processor is further configured to store load information of each network node identified in each service description.

8. The network apparatus of claim 7, wherein the service description is stored in the service registration, and wherein the processor is further configured to select the service description according to load information of the network node identified by the service description.

9. The network apparatus of claim 1, wherein the processor is further configured to store state information of each network node identified in the service description in the service registration.

10. The network apparatus of claim 9, wherein the service registration comprises the service description having a same named service as another service description, and wherein the processor is further configured to select one of the service description or the another service description according to state information of network nodes identified by the service description and the another service description.

11. A method of forwarding named service requests, comprising:
   storing a first service description in a service registration, wherein the first service description comprises a name of a service and a network node identifier identifying a network node that provides the service;
   storing a second service description in the service registration, wherein the second service description comprises the name of the service and a second network node identifier identifying a second network node that provides the service, the service of the first service description and the service of the second service description being the same;
   receiving a first service request, the first service request comprising a request for the service;
   receiving a second service request, the second service request comprising a second request for the service;
   choosing between the first service description and the second service description according to a comparison of a load on the network node associated with the first service description and a second load on the second network node associated with the second service description;
   selecting the network node identifier when the first service description has been chosen and selecting the second network node identifier when the second service description has been chosen; and
   transmitting the first service request to the network node when the network node identifier has been selected and transmitting the second service request to the second network node when the second network node identifier has been selected.

12. A method of forwarding named service requests, comprising:
   storing a first service description in a service registration, wherein the first service description comprises a name of a service and a network node identifier identifying a network node that provides the service;
   storing a second service description in the service registration, wherein the second service description comprises the name of the service and a second network node identifier identifying a second network node that provides the service, the service of the first service description and the service of the second service description being the same;
   receiving a first service request, the first service request comprising a request for the service;
   receiving a second service request, the second service request comprising a second request for the service;
   choosing between the first service description and the second service description according to a comparison of a speed of a connection to the network node associated with the first service description and a speed of a connection to the second network node associated with the second service description;
   selecting the network node identifier when the first service description has been chosen and selecting the second network node identifier when the second service description has been chosen; and
   transmitting the first service request to the network node when the network node identifier has been selected and transmitting the second service request to the second network node when the second network node identifier has been selected.

* * * * *

UNITED STATES PATENT AND TRADEMARK OFFICE
CERTIFICATE OF CORRECTION

PATENT NO. : 10,389,620 B2
APPLICATION NO. : 15/689878
DATED : August 20, 2019
INVENTOR(S) : Wu Chou et al.

It is certified that error appears in the above-identified patent and that said Letters Patent is hereby corrected as shown below:

In the Claims

Column 11, Lines 26-27, Claim 10, should read:
10. The network apparatus of claim 9, wherein the service registration comprises the service description having a same service as another service description, and wherein the processor is further configured to select one of the service description or the another service description according to state information of network nodes identified by the service description and the another service description.

Signed and Sealed this
Eighth Day of October, 2019

Andrei Iancu
*Director of the United States Patent and Trademark Office*